United States Patent [19]

Brown

[11] 4,413,655
[45] Nov. 8, 1983

[54] PIPE REPAIR BYPASS SYSTEM

[76] Inventor: George T. Brown, Box 412, 255 Edge Ave., Valparaiso, Fla. 32580

[21] Appl. No.: 253,906

[22] Filed: Apr. 14, 1981

[51] Int. Cl.³ .................... F16L 55/12; F16L 55/18
[52] U.S. Cl. ..................................... 138/97; 138/93; 228/219
[58] Field of Search ............... 138/97, 93, 90, 89; 228/42, 119, 219

[56] References Cited

U.S. PATENT DOCUMENTS

| 147,929 | 2/1874 | Gaines. | |
|---|---|---|---|
| 775,124 | 11/1904 | Christman. | |
| 1,221,733 | 4/1917 | Henderson | 138/90 |
| 2,256,775 | 9/1941 | Hubbell | 138/89 |
| 2,322,842 | 6/1943 | French | 138/89 |
| 2,481,013 | 9/1949 | Henderson | 138/90 |
| 2,720,893 | 10/1955 | Foreman | 138/89 |
| 2,753,876 | 7/1956 | Kurt | 134/167 |
| 3,194,466 | 7/1965 | Davis | 138/90 X |
| 3,269,421 | 8/1966 | Telford et al. | 138/97 |
| 3,451,259 | 6/1969 | McNulty | 138/90 X |
| 3,586,056 | 6/1971 | Kipp et al. | 138/89 |
| 3,946,761 | 3/1976 | Thompson et al. | 138/93 X |
| 4,077,435 | 3/1978 | Van Scoy | 138/93 |
| 4,101,067 | 7/1978 | Sloan et al. | 228/219 X |

FOREIGN PATENT DOCUMENTS

| 212715 | 3/1924 | United Kingdom | 138/93 |
|---|---|---|---|
| 329401 | 5/1930 | United Kingdom | 138/93 |
| 1404467 | 8/1975 | United Kingdom | 228/219 |

OTHER PUBLICATIONS

Safety Main Stopper Company Bulletin No. 1380.

Primary Examiner—Stuart S. Levy
Assistant Examiner—Daniel P. Stodola
Attorney, Agent, or Firm—Roylance, Abrams, Berdo & Farley

[57] ABSTRACT

A pipe repair device has a tubular housing and an expandable seal. The tubular housing includes a central passageway extending along its longitudinal axis and opening on the opposite ends of the housing. A mechanism is provided at one end of the housing for attaching a conduit to the housing in fluid communication with the passageway. The expandable seals can comprise annular tubes of resilient material which are expanded to form a seal between the device and the pipe in which it is inserted by supplying fluid pressure to the tube interiors. A mechanism for supplying purge gas to the interior of the pipe adjacent the work area can be provided adjacent and downstream of the seals. When two seals are provided, an interstage volume is defined between the seals into which fluid may be conveyed and withdrawn. The device permits the fluid passing through the pipe to continue through and bypass the work area to avoid pressure build up at the seals, to completely isolate the work area from contamination from the pipe fluid and to permit continued operation or safe disposal of the pipe fluid.

8 Claims, 5 Drawing Figures

PIPE REPAIR BYPASS SYSTEM

The invention relates to a pipe repair bypass system for isolating the area of the pipe to be repaired from the fluid conveyed through the pipe to avoid contamination of the work area by the conveyed fluid during the repair operation.

BACKGROUND OF THE INVENTION

In certain industries, particularly in the nuclear and chemical fields, and in situations such as the repair of pipes on board a ship underway, pipe systems are repaired by welding or brazing. This welding or brazing must take place in an atmosphere which is free of contaminates from the pipe interior. Additionally, the welding or brazing often requires the presence of an inert atmosphere, especially for tungsten inert gas welding wherein the work area must be free of a chemically reactive atmosphere containing water vapor and oxygen. The chemically reactive atmosphere is displaced by inert gas such as argon or helium.

Conventional systems for repairing pipes involve the use of valves, plugs and pigs. These conventional devices are designed with the intention of completely stopping the flow of fluid through the pipe at a specific location in order to permit work at such location without contamination from the fluid conveyed through the pipe. These devices are disadvantageous in that they are not always able to completely stop the flow of fluid through the pipe, they require significant amounts of labor time to adjust and regulate them and they are difficult to manufacture, maintain and operate.

The most significant disadvantage is that an inferior joint is produced during the repair operations if the stoppage of pipe fluid is not complete and the fluid leaking through to the work area adversely affects the brazing or welding at the repair area. The inferior weld joints formed with the conventional devices are often not discovered to be unsatisfactory until subjected to pressure or subjected to radiographic or ultrasonic inspection. Additionally, these inferior joints result in additional expenses caused by reworking, plant down time, engineering review and, if necessary, application to the customer for acceptance of an inferior joint.

The flow of fluid past a seal is proportional to the pressure differential across the seal and inversely proportional to the resistance offered by the seal. The conventional valves, plugs and pigs, in attempting to halt all flow through a pipe, permit pressure to build up and cause leakage about the seal as a result of the pressure build up.

A typical example of a pipe line plugging system is disclosed in U.S. Pat. No. 4,077,435 to Van Scoy. The system disclosed in the Van Scoy patent suffers rom the deficiencies noted above. Additionally, this system is disadvantageous in that it requires substantial modification of the existing pipe system in order to permit its operation and does not have means for providing purge gas in the work area. Moreover, the Van Scoy system requires complete shutdown of the pipe system during repair work.

Conventional devices for repairing relatively small, household pipe systems are disclosed in U.S. Pat. No. 2,322,842 to French and U.S. Pat. No. 2,753,876 to Kurt. The French device includes a hollow tube with an expandable seal actuated by a mechanical screw mechanism. The end of the tube opposite the seal is provided with a valve to control the flow of fluid through the pipe, which valve is closed during repair of the pipe to halt fluid flow. The Kurt patent discloses a drain plug valve flushing device having an expandable body member which is expanded when flushing fluid flows through the device to prevent back flow of the flushing fluid in the pipe. The system of the French or Kurt patents would not be effective for use in an industrial pipe system since the seal would not be adequate, the systems do not have a mechanism to supply purge gas to the work area and they are otherwise not adaptable to the industrial environment.

BRIEF DESCRIPTION OF THE INVENTION

An object of the present invention is to provide a pipe repair bypass system with a central passageway therethrough and effective sealing means about its housing to completely isolate the work area from the fluid conveyed through the pipe, to minimize the pressure differential across the seals, thereby enhancing the integrity of the seal, and to permit the system to be operated during repair.

An additional object of the present invention is to provide a pipe repair bypass system which facilitates welding in an inert atmosphere (particularly for tungsten inert gas welding often required in nuclear and chemical plant environments) where a chemically-reactive atmosphere such as water vapor and oxygen within the pipe must be displaced by inert gas such as argon or helium by minimizing the volume and the time necessary for purging the pipe.

A further object of the present invention is to provide a pipe repair bypass system which will permit welding in an explosive environment, particularly natural gas pipeline.

Other objects, advantages and salient features of the present invention will become apparent from the following detailed description of a preferred embodiment of the invention.

Briefly described, the invention includes a pipe repair device comprising a tubular housing and an annular tube of resilient material. The tubular housing has a central passageway extending therethrough along a longitudinal axis and opening on opposite ends of the housing. One end of the housing has means for attaching a conduit to the housing in fluid communication with the passageway. The annular tube is mounted on an exterior surface of the housing and forms a seal between the housing and a pipe in which the housing is mounted. The tube is expanded to form the seal by a mechanism which supplies and relieves fluid pressure in the tube to control expansion and contraction of the tube.

The invention also includes a pipe repair bypass device comprising a tubular housing, expandable seal means and purge gas means. The housing is described above. The expandable seal means is mounted on an exterior of the housing, forms a seal between the housing and the pipe in which the housing is mounted and is operated by a mechanism for expanding the seal means in a direction substantially perpendicular to the longitudinal axis of the housing. The purge gas means is located between the seal means and the opposite end of the housing and supplies purge gas to the pipe interior.

The invention further includes a pipe repair bypass device with a housing as described above. Two annular expandable seals are mounted on an exterior surface of the housing and axially spaced along its longitudinal axis. The seal means forms a seal between the housing and a pipe in which the housing is mounted and defines an interstage volume therebetween upon its expansion by a mechanism which expands the seal means in a direction perpendicular to the longitudinal axis of the housing. Means are also provided for conveying fluid to and from the interstage volume in a controlled manner after expansion of the seal means.

The invention additionally includes a method of welding a pipe joint in a pipe system for conveying a fluid, comprising the steps of locating a pipe repair bypass device, having a central passageway therethrough along a longitudinal axis and opening on opposite ends of the housing, within a pipe adjacent and upstream of an area to be worked; coupling a conduit to a downstream end of the housing in fluid communication with the passageway; expanding a seal mounted on an exterior surface of the housing to form a seal between the housing and pipe; passing the pipe fluid through the passageway and conduit during welding of the pipe joint.

By forming and operating the pipe repair bypass device in this manner, these objects are obtained. The central passageway and the coupling means permit the fluid to continue to flow through the pipe while bypassing the work area. This bypassing of the fluid flow decreases the pressure on the seal means and permits the pipe system to operate during the repair operations. The expandable seal means comprising a hollow tube of resilient material which is expanded by fluid pressure supplied thereto forms a highly efficient seal between the device housing and the pipe in which it is mounted to prevent contamination of the work area.

The purge gas means permits purge gas to be supplied to the pipe interior adjacent to permit the weld to be made in an inert atmosphere. Since the purge gas is supplied at a location adjacent to the work area, both the amount of gas needed to purge the pipe and the time for purging are significantly reduced, thereby facilitating pipe repair.

The use of two seals defining an interstage volume therebetween with means for conveying fluid to and from the interstage volume provides further protection against contamination of the work area by the pipe fluid. This is particularly advantageous for pipe systems conveying explosive and flammable fluids. Additionally, the interstage volume may be pumped to withdraw any pipe fluid which may have seeped through the first or upstream seal. Regulators can be employed to maintain the interstage volume at an intermediate pressure between the pipe system pressure and the ambient pressure of the work area to minimize leakage through the upstream seal and prevent all leakage past the downstream seal. For cryogenic applications, such as liquid natural gas pipe lines, the interstage volume can be maintained at a greater pressure than that of the pipe system by circulation of warm nitrogen gas therein, thereby creating a temperature gradient over the device and along the pipe surface. This can be accomplished with regulators, heaters, relief devices and tubing.

Still further, the system of the present invention may be used as a temporary coupling in a pipe system to continue operation before complete repair can be effected. This would be particularly advantageous in a vessel at sea.

BRIEF DESCRIPTION OF THE DRAWINGS

In order that the manner in which the foregoing and other objects are obtained in accordance with the invention can be understood in detail, a particularly advantageous embodiment thereof will be described with reference to the accompanying drawings, which form a part of the specification, and wherein.

DETAILED DESCRIPTION OF THE PREFERRED EMBODIMENT OF THE INVENTION

Figure 1:
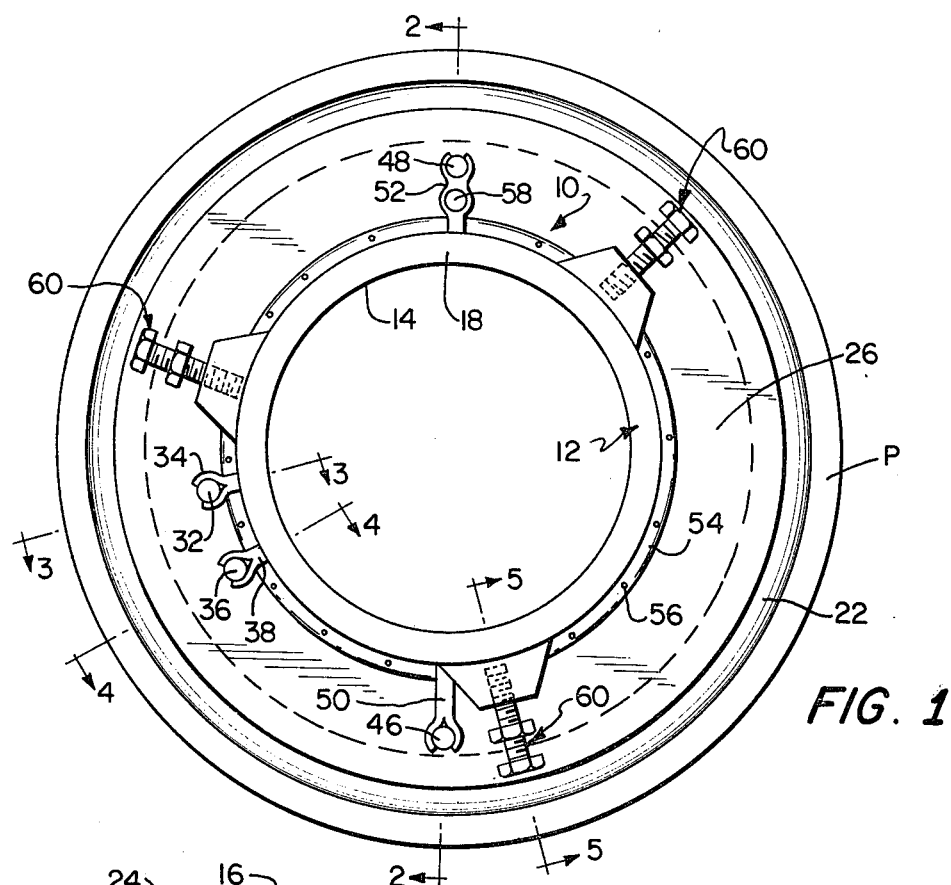
FIG. 1 is a front, elevational view of a pipe repair bypass device in accordance with the present invention mounted within a pipe to be repaired.

The pipe repair bypass device 10 of the present invention is mounted within a pipe P from one end thereof and is located adjacent the repair work area. Device 10 comprises an elongated tubular housing of circular cross section. A central passageway 14 extends along the longitudinal axis of tubular housing 12 and opens on opposite upstream and downstream ends 16, 18 of housing 12. The upstream and downstream ends of housing 12 are oriented according to the fluid flow through pipe 12. A suitable mechanism 17 is provided on housing 12 adjacent downstream end 18 for attaching a conduit to housing 12 in fluid communication with passageway 14. This mechanism may take the form of internal or external screw threads, a radial flange or other coupling arrangement. With device 10 mounted within pipe P and a conduit coupled to downstream end 18 of housing 12, fluid flowing through pipe 12 may pass through passageway 14 and into the conduit to convey the fluid to a desired location to continue operation of the pipe system or to properly dispose of the pipe fluid.

An expandable seal arrangement is mounted circumferentially about the exterior surface of housing 12 adjacent upstream end 16. The seal arrangement comprises two expandable tubes 20, 22 formed of resilient or elastomeric material. Upstream and downstream annular flanges 24, 26 extend from the exterior surface of housing 12 in a radial direction relative to the longitudinal axis of housing 12. Flanges 24, 26 are formed as unitary portions of housing 12 and are spaced apart along the longitudinal axis of housing 12. The radially outermost surfaces of flanges 24, 26 have annular grooves 28, 30 formed therein for receiving tubes 20, 22, respectively. Grooves 28, 30 are of semi-circular cross section.

Figure 3:
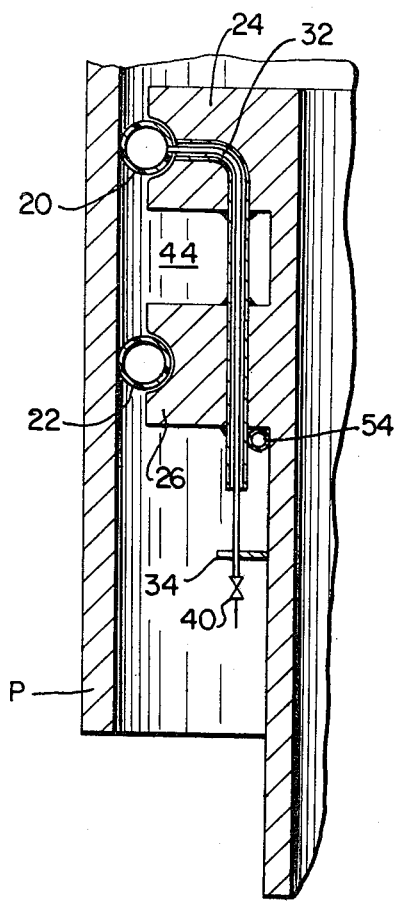
FIG. 3 is a partial, side elevational view of the pipe repair bypass device of FIG. 1 taken along lines 3—3 of FIG. 1.
Figure 4:
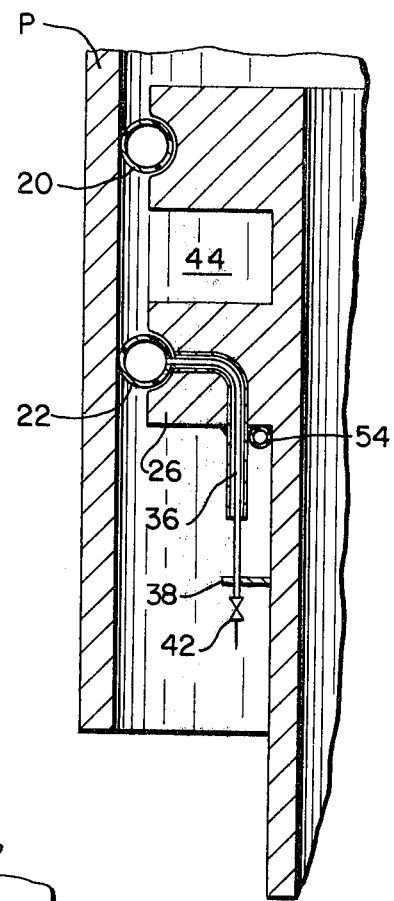
FIG. 4 is a partial, side elevational view of the pipe repair bypass device of FIG. 1 taken along lines 4—4 of FIG. 1.

Referring now to FIGS. 1, 3 and 4, tubes 20, 22 are hollow and can be expanded to form a seal between housing 12 and pipe P by supplying fluid pressure, such as air pressure, to the interior of each tube. In an explosive environment, inert gas can be used to pressurize the tubes. Contraction of the tubes to facilitate removal of device 10 from pipe P is accomplished by relieving the fluid pressure within tubes 20, 22. Tubes 20, 22 expand and contract in a direction substantially perpendicular to the longitudinal axis of housing 12. Fluid pressure is supplied to and relieved from tube 20 through conduit 32, which conduit extends through flanges 24, 26 and the space therebetween, and extends downstream from flange 26. Downstream of flange 26, conduit 32 is mounted in a bracket 34 fixed to and extending radially with respect to housing 12. In a similar manner, a conduit 36 extends through flange 26 and is in fluid communication with the interior of tube 22 to supply fluid pressure to and relieve fluid pressure from tube 22. Conduit 36 is supported in a bracket 38 which is similar to bracket 34. Valves 40, 42 control the fluid flow through conduits 32, 36, respectively. Thus, separate pressure control arrangements are provided for each of the sealing tubes 20, 22 to enable the expansion and contraction thereof to be accomplished separately. The separate actuation of tubes 20, 22 provides a greater safety factor in that one tube would remain inflated and provide a seal upon rupture of the other tube. Additionally, operational advantages can be realized by separate actuation of the tubes.

Figure 2:
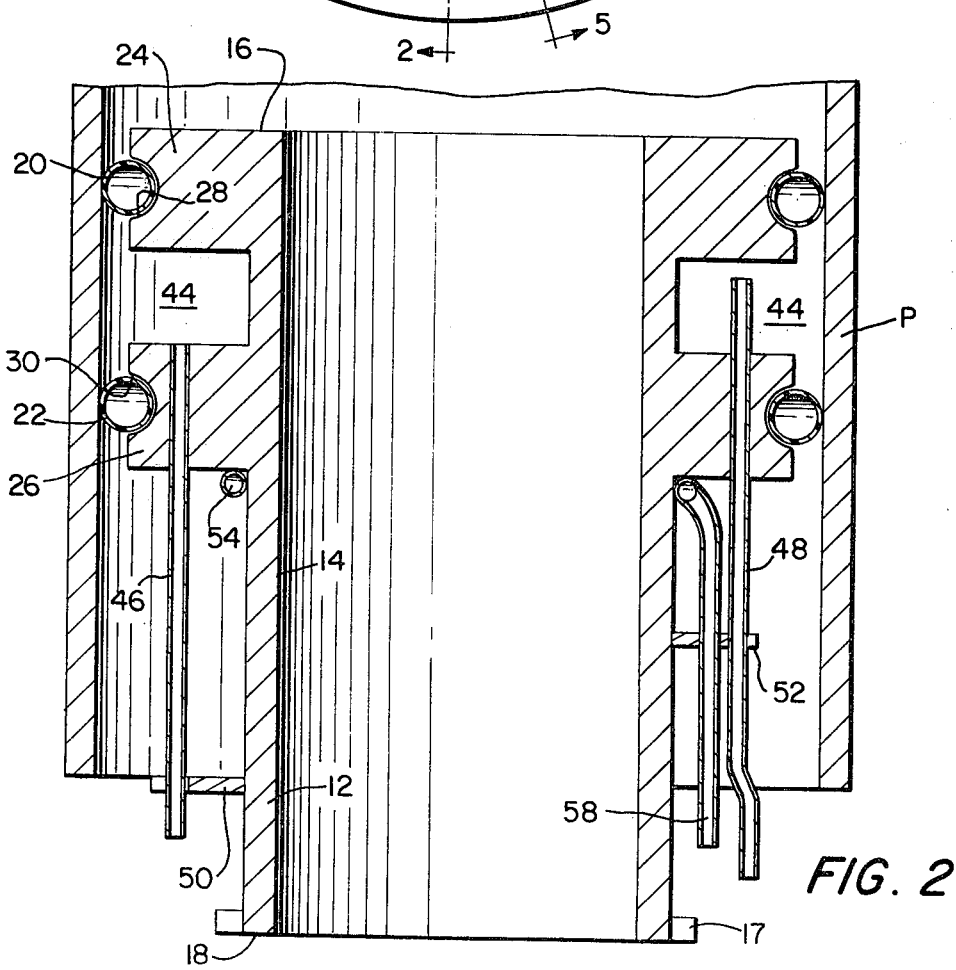
FIG. 2 is a side elevational view of the pipe repair bypass device of FIG. 1 in cross section taken along lines 2—2 of FIG. 1.

The axial spacing of sealing tubes 20, 22 defines an interstage volume 44 therebetween upon expansion of sealing tubes 20, 22. This volume is generally annular and extends between housing 12 and pipe P as illustrated in FIG. 2. Conduits 46, 48 extend parallel to and exteriorally of housing 12 to convey fluid to and from interstage volume 44 in a controlled manner. Suitable brackets 50, 52 extend from the exterior surface of housing 12 to support conduits 46, 48. A variety of different fluids can be conveyed into and out of interstage volume 44 through conduits 46, 48 depending on the work area environment and the intended function of the interstage volume.

The fluid passing through conduits 46, 48 can pressurize interstage volume 44 to a pressure greater than the pressure within pipe P to prevent leakage past sealing tube 20. Alternatively, volume 44 can be coupled to an exhaust fan or vacuum pump through conduits 46, 48 to maintain the volume at a relatively low pressure to remove any leakage into the interstage volume to prevent the leakage from seeping through into the work area downstream of sealing tube 22. The interstage volume can be maintained by means of suitable regulators and control relief devices at an intermediate pressure between the pressure within the pipe system and the ambient pressure of the work area to minimize leakage past sealing tubes 20, 22. Venting of the interstage volume can convey fluid therefrom to a safe area beyond the work area to avoid damage to the joint or danger of an explosion. Still further, for cryogenic applications such as natural gas pipelines, lines, the upstream expandable tube can be replaced by a suitable packing material to restrict the flow and the interstage volume can be maintained at a greater pressure than the pipeline system pressure by circulating warm nitrogen gas. This creates a temperature gradient over the device and along the pipe to provide further protection. Peripheral equipment, such as regulators, heaters, relief devices and tubing, can be employed to maintain the interstage volume at the desired temperature and pressure.

As illustrated in FIGS. 1 and 2, an annular purge gas tube 54 is attached to and extends about the periphery of housing 12 on the downstream surface of radial flange 26. Purge gas tube 54 has a series of orifices 56 formed in its wall to provide fluid communication between the hollow interior of the tube and the exterior of the tube. A supply conduit 58 is mounted exteriorly of housing 22 on bracket 52 and is coupled in fluid communication with the interior of tube 54 to supply purge gas to tube 54. When device 10 is sealed within pipe P, purge gas, supplied to purge gas tube 54 through conduit 58, passes through orifices 56 and into the space between housing 12 and pipe P to permit welding in an inert atmosphere. Inert gases, such as argon or helium, displace chemically-reactive ambient atmosphere containing water vapor and oxygen to facilitate tungsten inert gas welding employed in nuclear and chemical plants. Tube 54 quickly and uniformly distributes the purge gas to minimize the purging time.

Figure 5:
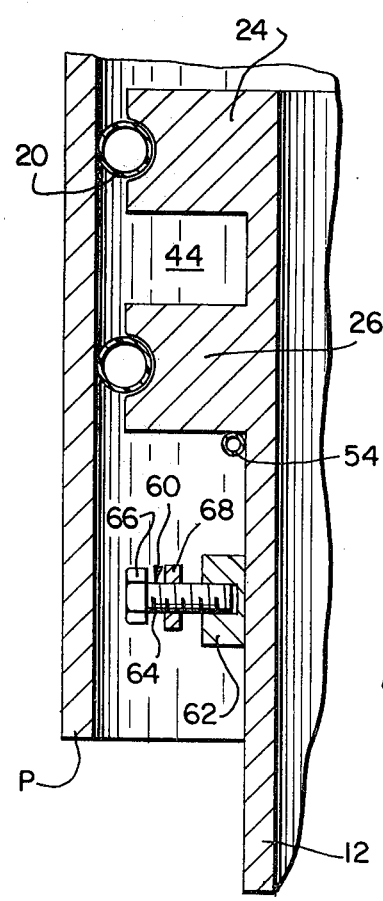
FIG. 5 is a partial, side elevational view of the pipe repair bypass device of FIG. 1 in cross section taken along lines 5—5 of FIG. 1.

Three equally spaced, mechanical jack members 60 extend radially outwardly from housing 12 as illustrated in FIGS. 1 and 5. Each jack member 60 comprises an internally threaded boss 62 extending radially outwardly from the exterior surface of housing 12 and downstream of radial flange 26, an externally threaded bolt 64 with an enlarged head 66, and an internally threaded lock nut 68. One end of threaded bolt 64 is threadally engaged with the threaded aperture in boss 62. When device 10 is mounted within pipe P, bolts 64 are threaded within the apertures in bosses 62, such that bolts 64 move in a radially outward direction (i.e., in a direction perpendicular to the longitudinal axis of housing 12) until heads 66 contact the interior surface of pipe P. This secures and centers housing 12 within pipe P. Once housing 12 is properly positioned within pipe P by bolts 64, lock nuts 68 are threaded against bosses 62 to secure bolts 64 in place.

In operation, device 10 is mounted within a pipe P to be repaired such that jack members 60 are located a short distance upstream of the work area. The jack members are then extended to center and secure device 10 within pipe P. Fluid passes through conduits 32, 36 to inflate sealing tubes 20, 22, thereby forming a seal between housing 12 and pipe P. A conduit is connected to downstream end 18 of housing 12 such that the fluid from pipe P passing through passageway 14 is conveyed through the conduit as desired. Once device 10 is properly sealed to the pipe and the pipe fluid is conveyed through passageway 14 such that it bypasses the work area, suitable fluids may be conducted through conduits 46, 48, 58 to interstage volume 44 and to purge gas tube 54 as desired and as described hereinabove. Once the appropriate repair work has been completed, fluid is relieved from the sealing tubes 20, 22 and the jack members 60 are released from contact with pipe P to permit device 10 to be easily removed from pipe P.

The combination of the passageway 14 with the fluid expandable sealing tubes 20, 22, the interstage volume 44, or the purge gas tube 54, permit the device of the present invention to operate in a more efficient and safer manner than conventional pipe repair systems. The passageway 14 alleviates pressure on the seals to enhance their sealing capacity. This permits the device to be located adjacent the work area thereby decreasing the volume of the pipe needed to be purged by the purge gas. In conventional practice, sealing of the pipe is often attempted at some distance from the work area such that seepage through the seals takes time to arrive at the work area; however, this requires that a significant volume of the pipe be purged to perform welding in an inert atmosphere. Moreover, the present device permits continued operation or safe disposal of the fluids within the pipe without the build up of pressure.

This device may also be employed as a temporary coupling to permit operation of the pipe system before the repair operation can be effected, as well as during the repair operation.

While a certain advantageous embodiment has been chosen to illustrate the invention, it will be understood by those skilled in the art that various changes and modifications can be made therein without departing from the scope of the invention as defined in the appended claims.

What is claimed is:

1. A pipe repair bypass device, comprising a tubular housing having a central passageway extending therethrough along a longitudinal axis and opening on opposite ends of said housing;
    coupling means, mounted on one end of said housing, for attaching a conduit to said housing in fluid communication with said passageway;
    seal means comprising two, annular, expandable seals, mounted on an exterior surface of said housing upstream of the area to be repaired and spaced along said longitudinal axis, for forming a seal between said housing and a pipe in which said housing is mounted, said seal means defining an interstage volume therebetween which is sealed upon expansion of said seal means against the pipe;
    means for expanding said seal means in a direction substantially perpendicular to said longitudinal axis; and
    purge gas means, located between said seal means and said coupling means, for supplying gas to the pipe interior outside of said housing and downstream of said interstage volume, said seal means being completely located upstream of said purge gas means; whereby, the device safely relieves the pressure on said seal means by conveying the fluid in the pipe through the conduit, and said purge gas means produces turbulent flow of purge gas.

2. A pipe repair bypass device according to claim 1 wherein each said seal comprises an annular tube of resilient material.

3. A pipe repair bypass device according to claim 2, wherein each said annular tube has separate means for supplying and relieving fluid pressure therein.

4. A pipe repair bypass device according to claim 1, further comprises means for conveying fluid to and from said interstage volume in a controlled manner after expansion of said annular tubes.

5. A pipe repair bypass device according to claim 1, wherein said purge gas means comprises an annular tube having a series of orifices therein.

6. A pipe repair bypass device according to claim 1, wherein at least two jack members extend from said housing exterior surface and are movable in direction perpendicular to said longitudinal axis for securing and centering said housing in the pipe.

7. A pipe repair bypass device according to claim 6, wherein three, equally spaced jack members extend from said housing.

8. A pipe repair bypass device according to claim 6, wherein said jack members comprise bolts threaded in openings in said housing.

* * * * *